(12) United States Patent
Chen et al.

(10) Patent No.: US 8,573,825 B2
(45) Date of Patent: Nov. 5, 2013

(54) BACKLIGHT MODULE

(75) Inventors: Ming-Lung Chen, Hsin-Chu (TW);
Deng-Kuen Shiau, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 289 days.

(21) Appl. No.: 13/189,742

(22) Filed: Jul. 25, 2011

(65) Prior Publication Data

US 2012/0106195 A1 May 3, 2012

(30) Foreign Application Priority Data

Oct. 29, 2010 (TW) ............................... 99137222 A

(51) Int. Cl.
*F21V 7/04* (2006.01)
(52) U.S. Cl.
USPC ............................ 362/607; 362/612; 362/616
(58) Field of Classification Search
USPC .................. 362/607, 612, 616, 606, 609, 611
See application file for complete search history.

(56) References Cited

FOREIGN PATENT DOCUMENTS

| TW | 200643545 | 12/2006 |
|---|---|---|
| TW | M328017 | 3/2008 |
| TW | 200817788 | 4/2008 |
| TW | 200844571 | 11/2008 |
| TW | I315432 | 10/2009 |

OTHER PUBLICATIONS

English translation of abstract of TW 200817788.
English translation of abstract of TW 200844571.
English translation of abstract of TW 200643545.
English translation of abstract of TW I315432.
English translation of abstract of TW M328017.
CEATIC Press Release, Sanken Electric Co., Ltd., Displays Edge-Lighting Liquid Crystal Television Using Light Emitting Diode.

*Primary Examiner* — Vip Patel
(74) *Attorney, Agent, or Firm* — McClure, Qualey & Rodack, LLP

(57) ABSTRACT

This embodiment relates to a backlight module, comprising a first light guide plate and a second light guide plate, wherein a first lower structure layer and a second lower structure layer are disposed on the first light guide plate and the second light guide plate, respectively. The first lower structure layer includes a first primary strip and a first secondary strip, wherein the first primary strip is located between the first secondary strip and one side of the first light guide plate. The second lower structure layer includes a second primary strip and a second secondary strip, wherein the second primary strip is located between the second secondary strip and one side of the second light guide plate. The second primary strip is exposed outside the projection of the first lower structure layer on the second lower structure layer and the first lower structure layer at least partially overlaps the second secondary strip.

23 Claims, 6 Drawing Sheets

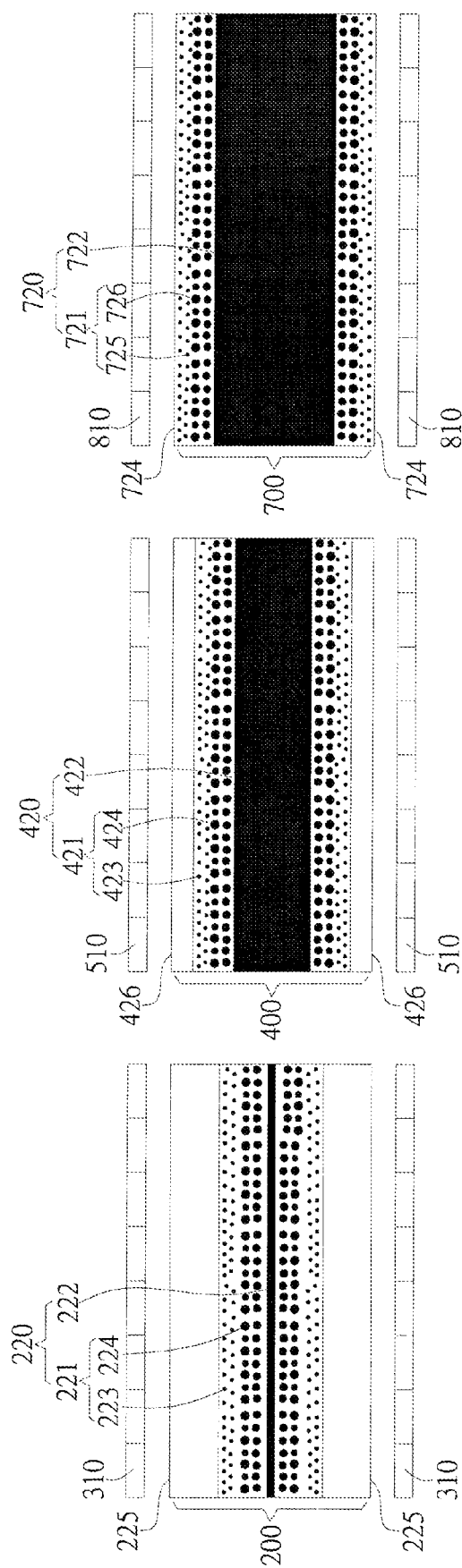
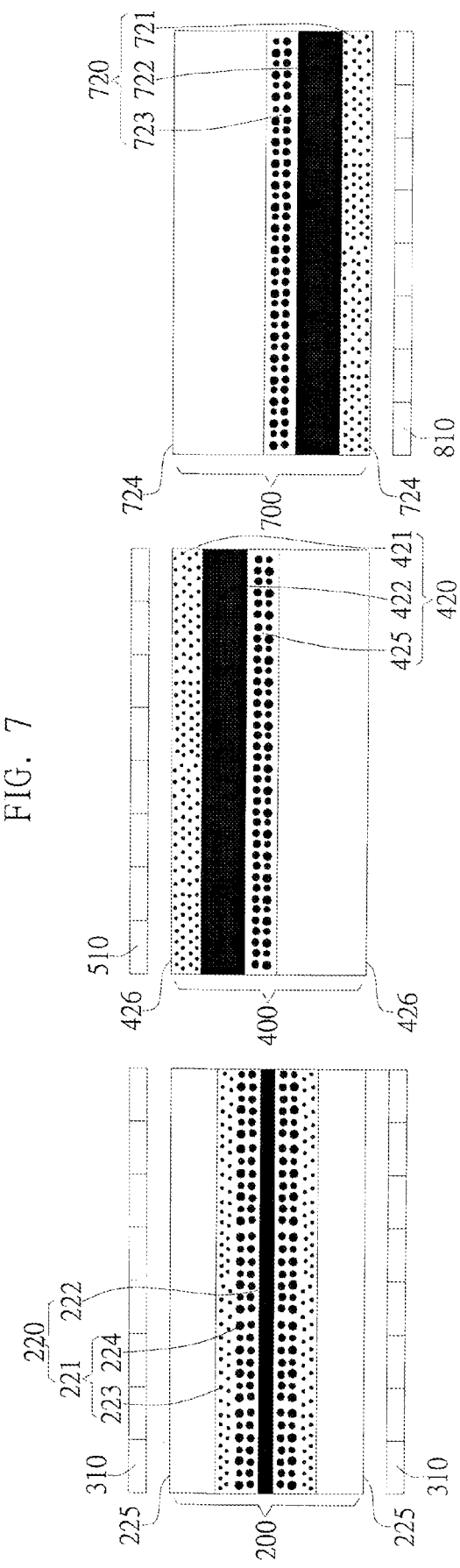
FIG. 7
FIG. 8

BACKLIGHT MODULE

BACKGROUND

1. Field of the Embodiment

This embodiment relates to a backlight module and specifically to a backlight module having a plurality of light guide plates with microstructure layers disposed thereon.

2. Description of the Prior Art

Display panels and flat displays using the display panels are now the mainstream in display technology, wherein the liquid crystal display panels are especially popular in the flat display technology and are now used extensively in electronic products such as monitors, home flat televisions, personal computers, monitors of the laptop computers, mobile phones, and display screens of digital cameras.

A backlight module is a crucial element in the conventional liquid crystal display. Liquid crystal itself does not generate light and the backlight module is used to provide the liquid crystal display panel with adequate and evenly distributed luminance for the liquid crystal display panel to generate images. The conventional backlight module uses only one light guide plate to guide the lights generated by the light sources, wherein luminance at every portion of the light guide plate is substantially the same. However, the backlight module will need to make adjustment in the structure of the light guide plate, in order to generate different luminance at different parts of the backlight module separately.

FIG. 1 is a schematic view illustrating a conventional backlight module 10. The conventional backlight module 10 includes a light guide portion 20 and a plurality of light sources 40, wherein those light sources 40 are disposed at two sides of the light guide portion 20 and emitting lights toward the light guide portion 20. As FIG. 1 shows, the light guide portion 20 includes a plurality of light guide plates 30, wherein each of the light sources 40 is disposed at one side of one of the light guide plates 30 and emits light toward the corresponding light guide plate 30. Furthermore, the bottom of each light guide plate 30 is disposed with a microstructure layer (not illustrated) to break the total internal reflection of lights travelling within the light guide portion 20 so that those lights can emerge from one side of the light guide plate 30 opposite to the microstructure layer.

Each one of the light guide plates 30 corresponds to a different portion of the light guide portion 20 and the conventional backlight module 10 can individually drive the light sources 40 to generate light emerging from different light guide plates 30. In this way, the conventional backlight module 10 can provide the visual effect of light areas being lit up separately.

Light generated by each of the light sources 40 is received by the corresponding light guide plate 30 and this shows that different portions of the conventional backlight module 10 illustrated in FIG. 1 can provide luminance separately by driving the corresponding light sources 40. However, a portion of light will inevitably travel toward the adjacent light guide plates 30 and emerge from surfaces of the adjacent light guide plates 30 opposite to the microstructure layer, thus creating light leakages at the boundaries of light guide plates 30. The light guide portion 20 of the conventional backlight module 10 is composed of a plurality of light guide plates 30 assembled together and therefore visible differences in luminance and chroma occur at the gaps between the light guide plates 30. In this way, viewers can easily recognize the gaps between light guide plates 30 from the visible differences in luminance and chroma. Furthermore, the process of assembling light guide plates 30 into the light guide portion 20 is cumbersome and requires great precision. In this way, deviation between light guide plates 30 occurs under external forces and thus prevents the backlight module 10 from providing the desired optical effect.

The undesired visual effects described above affect the overall visual experience of viewers. Therefore the question of how to create light areas while reducing light leakages and visible differences of luminance and chroma is indeed one of the important issues in the backlight module manufacturing.

SUMMARY

It is an objective of the present embodiment to provide a backlight module utilizing a plurality of light guide plates and a plurality of microstructure layers disposed on the light guide plates to break the total internal reflection of lights travelling within the light guide plates and create the visual effect of light areas being lit up separately.

It is another objective of the present embodiment to provide a backlight module utilizing the microstructure layers on the light guide plates to create light areas that can be lit up separately and decrease the difference of brightness as well as chroma between light areas.

The backlight module of the present embodiment includes a first light guide plate, a second light guide plate, a first light source set, and a second light source set, wherein the second light guide plate is stacked to the first light guide plate. Light sources included in the first light source set are disposed at one side of the first light guide plate and emit light toward the first light guide plate. Similarly, light sources included in the second light source set are disposed at one side of the second light guide plate and emit light toward the second light guide plate.

The first light guide plate includes a first upper structure layer and a first lower structure layer disposed at two opposite sides of the first light guide plate, respectively. The first upper structure layer includes a plurality of prisms, wherein the extending direction of the prisms is substantially parallel with the travelling direction of lights generated by the first light source set. The first lower structure layer includes a first primary strip with microstructure aperture ratio less than 60% and a first secondary strip with a microstructure aperture ratio greater than 60%. The first primary strip is located between the first secondary strip and the first light source set to break the total internal reflection of lights generated by the first light source set so that those lights can travel toward the first upper structure layer.

The second light guide plate includes a second upper structure layer and a second lower structure layer disposed at two opposite sides of the second light guide plate respectively, wherein the second upper structure layer faces the first lower structure layer of the first guide plate. The second upper structure layer includes a plurality of prisms, wherein the extending direction of the prisms is substantially parallel with the travelling direction of lights generated by the second light source set. The second lower structure layer includes a second primary strip with a microstructure aperture ratio less than 60% and a second secondary strip with a microstructure aperture ratio greater than 60%. The second primary strip is located between the second secondary strip and the second light source set to break the total internal reflection of lights generated by the second light source set so that those lights can travel toward the second upper structure layer and the first light guide plate.

Furthermore, the second primary strip is exposed outside the projection of the first lower structure layer on the second lower structure layer, wherein the projection of the first lower structure layer overlaps the second secondary strip. Furthermore, the projections of the first primary strip and the second primary strip at least partially overlap each other. In this way, lights areas created by the first primary strip and the second primary strip substantially overlap in order to prevent the occurrence of visible dark strips.

BRIEF DESCRIPTION OF THE DRAWINGS

FIG. 7 is a plane view illustrating the first lower structure layer, the second lower structure layer, and the third lower structure layer illustrated in FIG. 6; and FIG. 8 is a plane view of a variation of the first lower structure layer, the second lower structure layer, and the third lower structure layer illustrated in FIG. 7.

DETAILED DESCRIPTION OF THE PREFERRED EMBODIMENT

The embodiment relates to a backlight module, specifically to a backlight module having a plurality of stacked light guide plates with microstructure layers disposed thereon. The backlight module of the embodiment uses the microstructure layers on the light guide plates to form a plurality of light areas and reduce the differences in brightness between lighting areas and in chroma between lighting areas.

Figure 1:
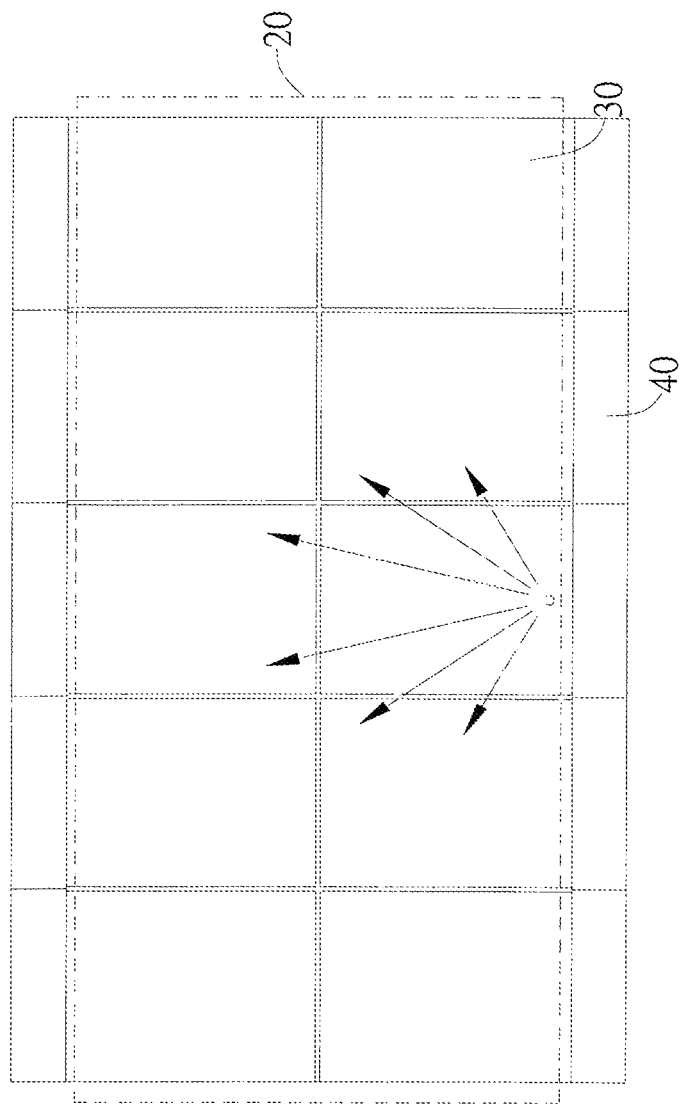
FIG. 1 is a schematic view of a conventional backlight module.
Figure 2:
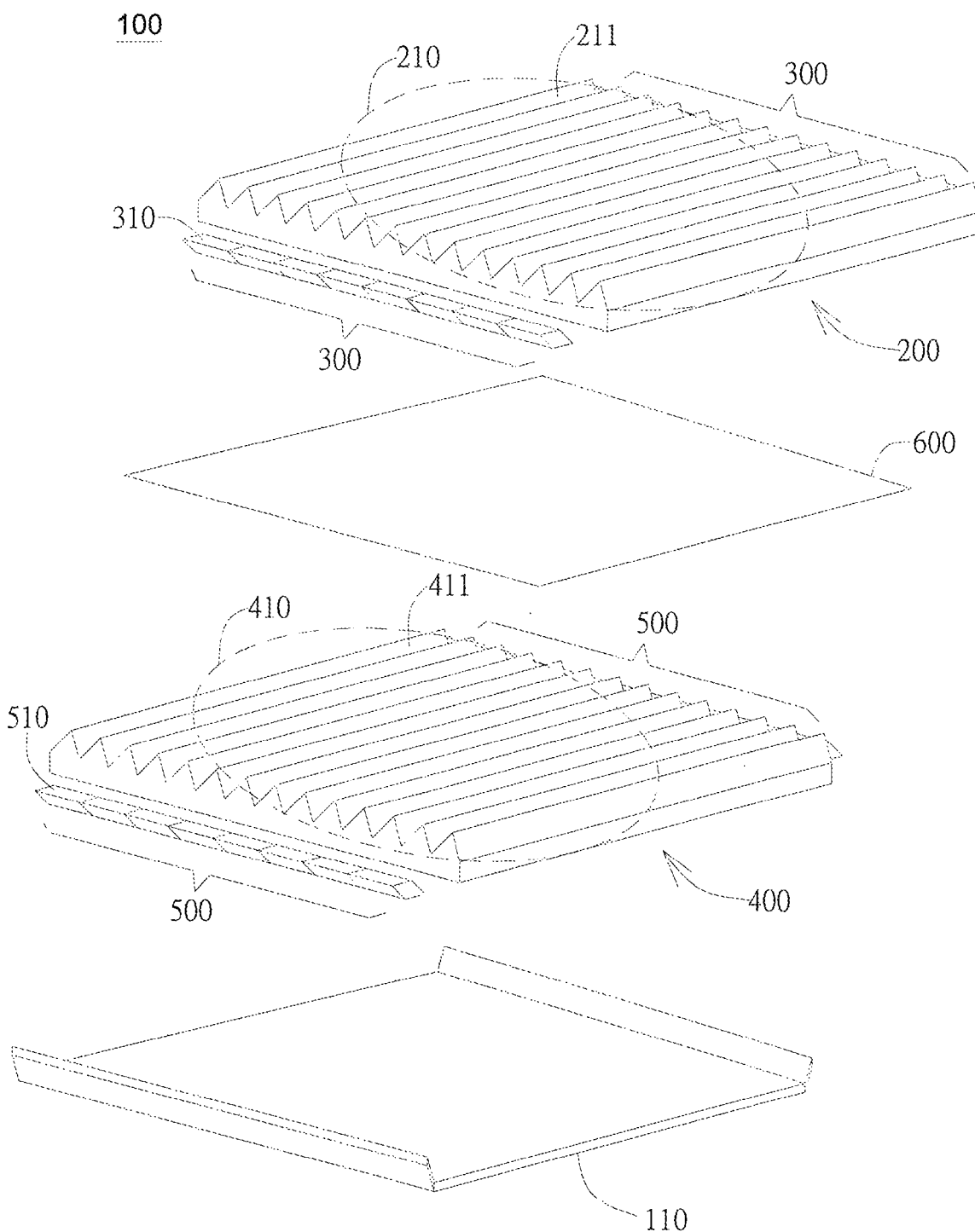
FIG. 2 is an exploded view of the backlight module of the present embodiment.

FIG. 2 is an exploded view of the backlight module 100 of the present embodiment. As FIG. 2 shows, the backlight module 100 includes a reflector 110, a first light guide plate 200, a first light source set 300, a second light guide plate 400, and a second light source set 500, wherein the first light source set 300 and the second light source set 500 are disposed at the lateral sides of the first light guide plate 200 and the second light guide plate 400, respectively.

Furthermore, as FIG. 2 shows, the backlight module 100 of the present embodiment further includes a first diffusion film 600 disposed between the first light guide plate 200 and the second light guide plate 400 to prevent friction from occurring between the first light guide plate 200 and the second light guide plate 400. In addition, the internal structure and the material of the first diffusion film 600 can be used to process the light leaving from the second light guide plate 400 and mitigate the optical defects due to surface tolerances and internal structure tolerances of the second light guide plate 400 as well as environmental influences such as particle pollution. In other words, the first diffusion film 600 of the present embodiment is used to prevent the friction between light guide plates and compensate the optical defects due to tolerances of the light guide plates and environmental influences.

In the embodiment illustrated in FIG. 2, the first light source set 300 and the second light source set 500 include a plurality of first light sources 310 and a plurality of second light sources 510, respectively, wherein the first light sources 310 and the second light sources 510 are light emitting diodes. In addition, the first light guide plate 200 is divided by the first light sources 310 into a plurality of light areas, wherein different light areas correspond to different first light sources 310. In this way, the first light sources 310 can be separately driven to provide the corresponding light areas with enough light to generate the overall luminance required.

Similarly, the second light guide plate 400 is divided by the second light sources 510 into a plurality of light areas, wherein different light areas correspond to different second light sources 510. In this way, the second light sources 510 can be relatively driven to provide the corresponding light areas with enough light to generate the overall luminance required.

As FIG. 2 shows, a first upper structure 210 and a second upper structure layer 410 are disposed on the first light guide plate 200 and the second light guide plate 400, respectively. The first upper structure layer 210 is located on one surface of the first guide plate 200 facing away from the second light guide plate 400 whereas the second upper structure layer 410 is located on one surface of the second light guide plate 400 facing the first light guide plate 200. The first upper structure layer 210 includes a plurality of first prisms 211, wherein the first prisms 211 linearly extend from one side of the first light guide plate 200 disposed with the first light sources 310 toward the other side of the first light guide plate 200 disposed with the first light sources 310. This shows that the extending directions of the first prisms 211 are substantially parallel to the travelling direction of lights emitted by the first light source set 300. In this way, lights generated by the first light source set 300 can use the extending directions of the first prisms 211 to travel toward the other side of the first light guide plate 200 along a substantially straight line without significantly dispersing in other directions to facilitate the local lighting control of light areas and this controls the light leakage between light areas.

Similarly, the second upper structure layer 410 includes a plurality of second prisms 411, wherein the second prisms 411 are distributed from one side of the second light guide plate 400 and linearly extend toward the other side of the first light guide plate 200 disposed with the second light source set 500. In this way, the second prisms 411 extend in a direction substantially parallel to the travelling direction of the lights emitted by the second light source set 500. This shows that the light generated by the second light source set 500 can use the extending directions of the second prisms 411 to travel toward the other side of the second light guide plate 400 along a substantially straight line without significantly dispersing in other directions and thus facilitates the divisional lighting control of light areas. This also shows that the extending directions of the first prisms 211 and the extending directions of the second prisms 411 are substantially parallel, but are not limited thereto; in different embodiments, an angle can be included between the extending directions of the first prism 211 and the second prism 411.

Figure 3:
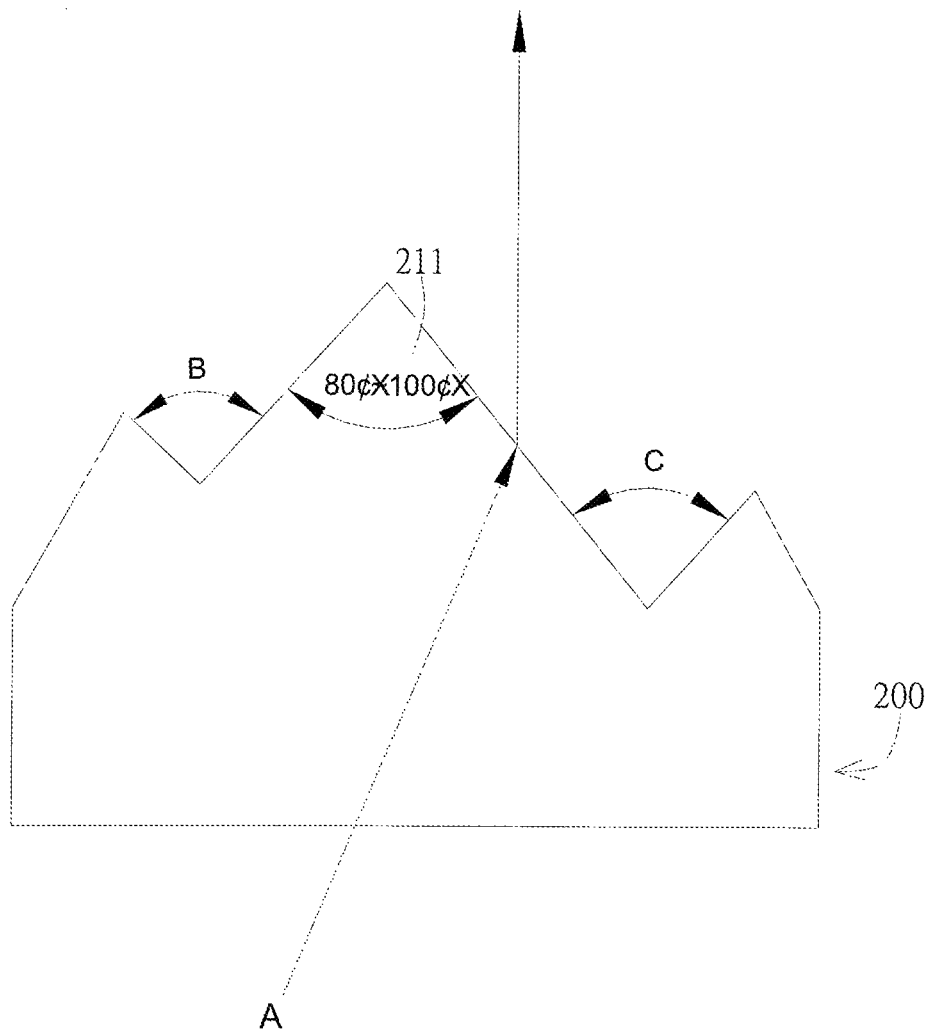
FIG. 3 is a cross-sectional view of the first upper structure layer of the backlight module illustrated in FIG. 2.

Please refer to the exploded view of FIG. 2 and the cross-sectional view of the first light guide plate 200 of FIG. 3. In the embodiment illustrated in FIG. 2 and FIG. 3, when a light A enters the first light guide plate 200 and contacts the first prism 211, the first prism 211 will change the traveling direction of the light A so that light A can exit the first light guide plate 200 in a direction that is nearly perpendicular to its surface. In this way, more light exiting the first light guide plate 200 can be received by two eyes of viewers. It also shows that the first prisms 211 can be used to guide the lights generated by the first light sources 310 and used as a light enhancement film.

In the present embodiment, the first prisms 211 have different apex angles, different heights or different widths, but are not limited thereto; in different embodiments, the first prisms 211 can also have the same apex angles, the same heights or the same widths based on the travelling directions of lights, the location of the first light source set 300 or other conditions. Furthermore, the first prisms 211 of the present embodiment preferably have an apex angle of 90°, but are not limited thereto; in different embodiments, the first prisms 211 can be adjusted to have an apex angle between 80° and 100° based on the travelling directions of lights and other conditions.

As FIG. 3 shows, the adjacent first prisms 211 of the present embodiment have the same angles B, C, but are not limited thereto; in different embodiments, the adjacent first prisms 211 have surfaces of different gradients so that different angles are included between adjacent first prisms 211. In this way, lights can all be directed to leave the surface of the first light guide plate 200 in a direction that is nearly perpendicular to the surface. Furthermore, the characteristics and structures of the second prisms 411 illustrated in FIG. 2 are substantially the same as the first prisms 211 and therefore not elaborated here.

Figure 4:
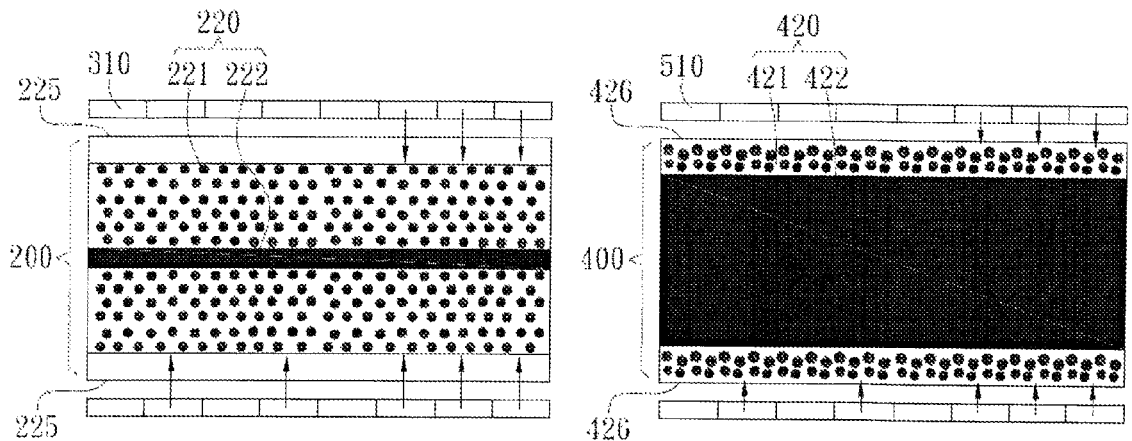
FIG. 4 is a plane view of the first lower structure layer on the first light guide plate and the second lower structure layer on the second light guide plate illustrated in FIG. 2.

FIG. 4 is a top view of the first lower structure 220 of the first light guide plate 200 and the second lower structure layer 420 of the second light guide plate 400. As FIG. 4 shows, the bottom surface of the first light guide plate 200 opposite to the first upper structure layer 210 is disposed with the first lower structure layer 220 to break the total internal reflection of lights within the first light guide plate 200, wherein the first light sources 310 emit light toward the first light guide plate 200. The above-mentioned lights will travel within the first light guide plate 200 in a form of total internal reflection and eventually makes contact with the first lower structure layer 220, wherein the total internal reflection of the lights will be broken by the first lower structure layer 220 and then the light exits the first light guide plate 200 through the first upper structure layer 210.

Similarly, the bottom surface of the second light guide plate 400 opposite to the second upper structure layer 410 is disposed with the second lower structure layer 420 to break the total internal reflection of lights within the second light guide plate 400, wherein the second light sources 510 emit light toward the second light guide plate 400. The lights generated by the second light sources 510 travel within the second light guide plate 400 also in a form of total internal reflection and also makes contact with the second lower structure layer 420, wherein the total internal reflection of those lights will be broken by the second lower structure layer 420 and then the light exits the second light guide plate 400 through the second upper structure layer 410.

As FIG. 4 shows, the first lower structure layer 220 of the first light guide plate 200 includes two first primary strips 221 and a first secondary strip 222. As FIG. 4 shows, the first secondary strip 222 is located at the centre of the first light guide plate 200 and is distributed along a first side 225 of the first light guide plate 200, wherein two first primary strips 221 are distributed along two opposite sides of the first secondary strip 222. In other words, the first primary strip 221 and the first secondary strip 222 extend in directions parallel to each other, wherein the first primary strip 221 is located between the first secondary strip 222 and the first side 225. Furthermore, the first side 225 is preferably a longer side of the light guide plate 200 in order to provide better optical result.

In the present embodiment, the aperture ratio of the first primary strip 221 is less than 60% while the aperture ratio of the first secondary strip 222 is greater than 60%. The above-mentioned aperture ratio refers the distribution of microstructures on a unit area. For instance, if the microstructures are fully distributed on a unit area, then the aperture ratio of the unit area is 100%. This shows that the aperture ratio represents the ratio of microstructures on optical substrates for reducing the loss of light generated by light sources. Therefore under the same conditions, the light guide plate with greater aperture ratio allows more light to be utilised.

Furthermore, the first lower structure layer 220 of the present embodiment includes microstructures such as a printed strip, a printed dot, a raised strip, a raised dot, a recessed strip, a recessed dot, or a combination thereof. Furthermore, the dots include shapes such as circles, ellipses, or other similar shapes. The first primary strip 221 and the first secondary strip 222 of the present embodiment include a plurality of printed dots, but are not limited thereto; in different embodiments, the first primary strip 221 and the first secondary strip 222 can have other combinations of microstructures based on the distributions and sizes of light areas and the luminous intensity of the first light source set 300.

In the embodiment illustrated in FIG. 4, the first primary strip 221 will break a portion of the total internal reflection of lights generated by the first light sources 310 in the first light guide plate 200. In addition, a portion of lights will travel within the first light guide plate 200 and make contact with the first secondary strip 222, wherein those lights will be broken by the first secondary strip 222 and eventually leave the first light guide plate 200 through the surface opposite to the first lower structure layer 220.

As FIG. 4 shows, the second lower structure layer 420 of the second light guide plate 400 includes two second primary strips 421 and a second secondary strip 422, wherein the second primary strips 421 are distributed along two opposite sides of the second secondary strip 422. As FIG. 4 shows, the first side 225 of the first light guide plate 200 is parallel to the second side 426 of the second light guide plate 400. In the present embodiment, the aperture ratio of the second primary strip 421 is less than 60% while the aperture ratio of the second secondary strip 422 is greater than 60%.

The second secondary strip 422 illustrated in FIG. 4 is located at the center of the second light guide plate 400 and is also distributed along the second side 426 of the second light guide plate 400. Furthermore, the two second primary strips 421 are distributed along two sides of the second secondary strip 422. In other words, the second primary strip 421 and the second secondary strip 422 extend in directions parallel to each other, wherein the second primary strip 421 is located between the second secondary strip 422 and the second side 426. In addition, the second side 426 is preferably the longer side of the second light guide plate 400 for providing better optical effect. The second light sources 510 are disposed at the second sides 426 of the second light guide plate 400 and emit lights toward the second light guide plate 400, wherein those lights travelling within the second light guide plate 400 in a form of total internal reflection and are then broken by the second primary strip 421 and the second secondary strip 422 so that those lights can leave the second light guide plate 400 through the surface opposite to the second lower structure layer 420.

Similarly, the second primary strip 421 and the second secondary strip 422 of the present embodiment is a plurality of printed dots, but is not limited thereto; in different embodiments, the second primary strip 421 and the second secondary strip 422 can have other combinations of microstructures based on conditions such as the distributions and sizes of light areas and the luminous intensity of the second light source set 500, wherein the microstructures includes printed strips, printed dots, raised strips, raised dots, recessed strips, recessed dots, or a combination thereof.

Furthermore, the printed dots or raised dots include shapes such as circles, ellipses, or other similary shapes. In addition, in the embodiment illustrated in FIG. 4, the area of the first lower structure layer 220 can be adjusted to be less than the area of the second lower structure layer 420.

Here please refer to the exploded view in FIG. 2 and the plane view of FIG. 4. In the embodiment illustrated in FIG. 2 and FIG. 4, the area of the first lower structure layer 220 is less than the area of the second lower structure layer 420. Furthermore, the projection of the first light guide plate 200 on the second light guide plate 400 substantially overlaps the projection of the second light guide plate 400 on the first light guide plate 200. The second primary strip 421 is exposed outside the projection of the first lower structure layer 220 on the second lower structure layer 420 and the first lower structure layer 220 at least partially overlaps the second secondary strip 422.

Preferably, the projection of the first secondary strip 222 on the second lower structure layer 420 substantially overlaps the second secondary strip 422 and the area of the first lower structure layer 220 is preferably greater than the area of the second secondary strip 422. Please note that most of the lights traveling within the first light guide plate 200 are emitted through the first primary strip 221 and most of the lights traveling within the second light guide plate 400 are emitted through the second primary strip 421, wherein the projection of the first primary strip 221 and the projection of the second primary strip 421 slightly overlap each other. In other words, the area of the first lower structure layer 220 is substantially greater than the area of the second secondary strip 422 and the structure mentioned above is used to blur the boundaries between the projections in order to prevent the occurrence of visible dark strips. The first primary strip 221 and the second primary strip 421 are used to break the total internal reflections of lights within the light guide plates so that those light can emerge from different portions of the first light guide plate 200. In other words, the backlight module 100 of the present embodiment uses the differences between the projection of the first primary strip 221 and the projection of the second primary strip 421 to control the first light source 310 and the second light source 510 to further control where light eventually emerges from the first light guide plate 200 in order to create light areas.

Furthermore, in order to improve the optical effect, the area of the first secondary strip 222 is preferably less than the area of the second secondary strip 422 so that the second primary strip 421 is substantially located between the second light source set 500 and the projection of the first secondary strip 222 on the second lower structure layer 420.

Furthermore, please again refer to the exploded view of FIG. 2 and the plane view of FIG. 4. As FIG. 4 shows, the distance between the second lower structure layer 420 and the second light source set 500 is less than the distance between the first lower structure layer 220 and the first light source set 300. In this way, the lights traveling in the second light guide plate 420 is less subject to intensity decay and thus the intensity of lights generated by the second light guide plate 400 is greater than the intensity of lights generated by the first light guide plate 200. For this reason, the luminous intensity of the first light source set 300 is greater than the luminous intensity of the second light source set 500 in order to compensate for the difference in the overall luminous intensities between the first light guide plate 200 and the second light guide plate 400.

Furthermore, in the embodiment illustrated in FIG. 4, the first light guide plate 200 is divided by the first light sources 310 into a plurality of light areas, wherein the first light sources 310 are separately driven to provide the corresponding light areas with light to generate the desired luminance. Similarly, the second light guide plate 400 is divided by the second light sources 510 into a plurality of light areas, wherein the second light sources 510 are separately driven to provide the corresponding light areas with light to generate the desired luminance. In this way, each of the light sources 310, 510 can be selectively driven to generate luminance at the desired location. However, based on the image to be displayed, all of the light sources 310, 510 can be driven at the same time to provide all light areas with light in order to generate more luminance.

Figure 5:
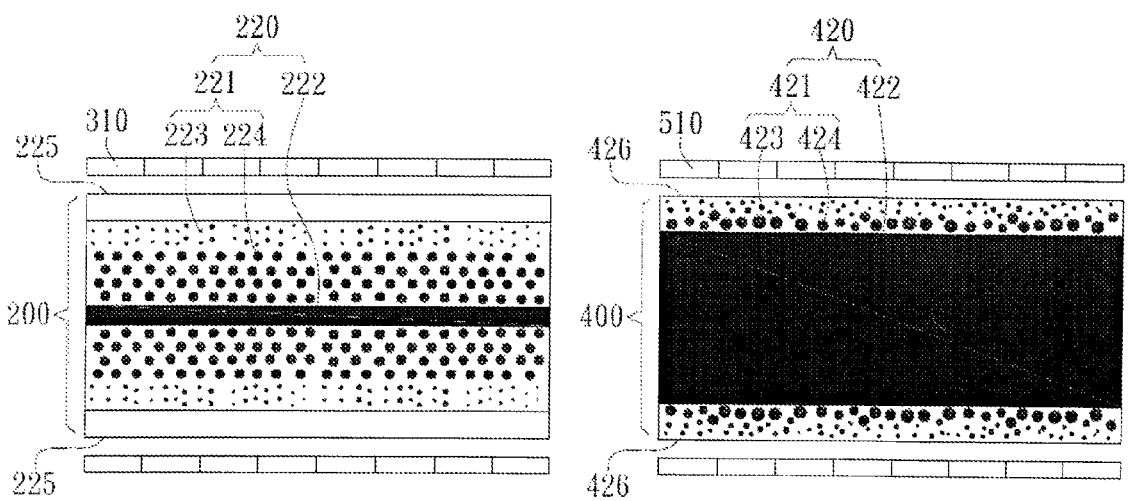
FIG. 5 is a plane view of a variation of the first lower structure layer and the second lower structure layer illustrated in FIG. 4.

FIG. 5 is a plane view of the first light guide plate 200 and the second light guide plate 400 in another embodiment of the present embodiment. As FIG. 5 shows, the first primary strip 221 includes a first microstructure region 223 and a second microstructure region 224, wherein the second microstructure region 224 is located between the first microstructure region 223 and the first secondary strip 222. Furthermore, the microstructure aperture ratio of the first microstructure region 223 is less than the microstructure aperture ratio of the second microstructure region 224. In this way, the microstructure aperture ratio of the first lower structure layer 220 decreases from the first secondary strip 222 toward the first side 225.

Furthermore, in the embodiment illustrated in FIG. 5, the second primary strip 421 also includes a third microstructure region 423 and a fourth microstructure region 424, wherein the fourth microstructure region 424 is located between the third microstructure region 423 and the second secondary strip 422. Furthermore, the microstructure aperture ratio of the third microstructure region 423 is less than the microstructure aperture ratio of the fourth microstructure region 424. In this way, the microstructure aperture ratio of the second lower structure layer 420 decreases from the second secondary strip 422 toward the second side 426.

In the embodiment illustrated in FIG. 5, the aperture ratio of the microstructures in the first lower structure layer 220 and the second lower structure layer 420 increases from one side of the corresponding light guide plate to the centre and the distribution of the microstructures per unit area also increases. In this way, the pattern, size, distribution range, and distribution density of the microstructures can be adjusted based on design requirements. For instance, in order for the aperture ratio of the microstructure to increase from one side to the other side, the microstructure aperture ratio in the embodiment illustrated in FIG. 5 can be realized by using microstructures having the same size but with different distribution densities, microstructures of the same distribution density but different sizes, or microstructures having smaller size but distributed in higher density.

In the embodiment illustrated in FIG. 4 and FIG. 5, in order to improve the lighting efficiency, the area of the first secondary strip 222 is preferably less than 30% of the bottom area of the first light guide plate 200. The area of the second secondary strip 422 is between 30% and 90% of the bottom area of the second light guide plate 400, but is not limited thereto; in different embodiments, the ratio of areas mentioned above can have other ratios based on design requirements.

Figure 6:
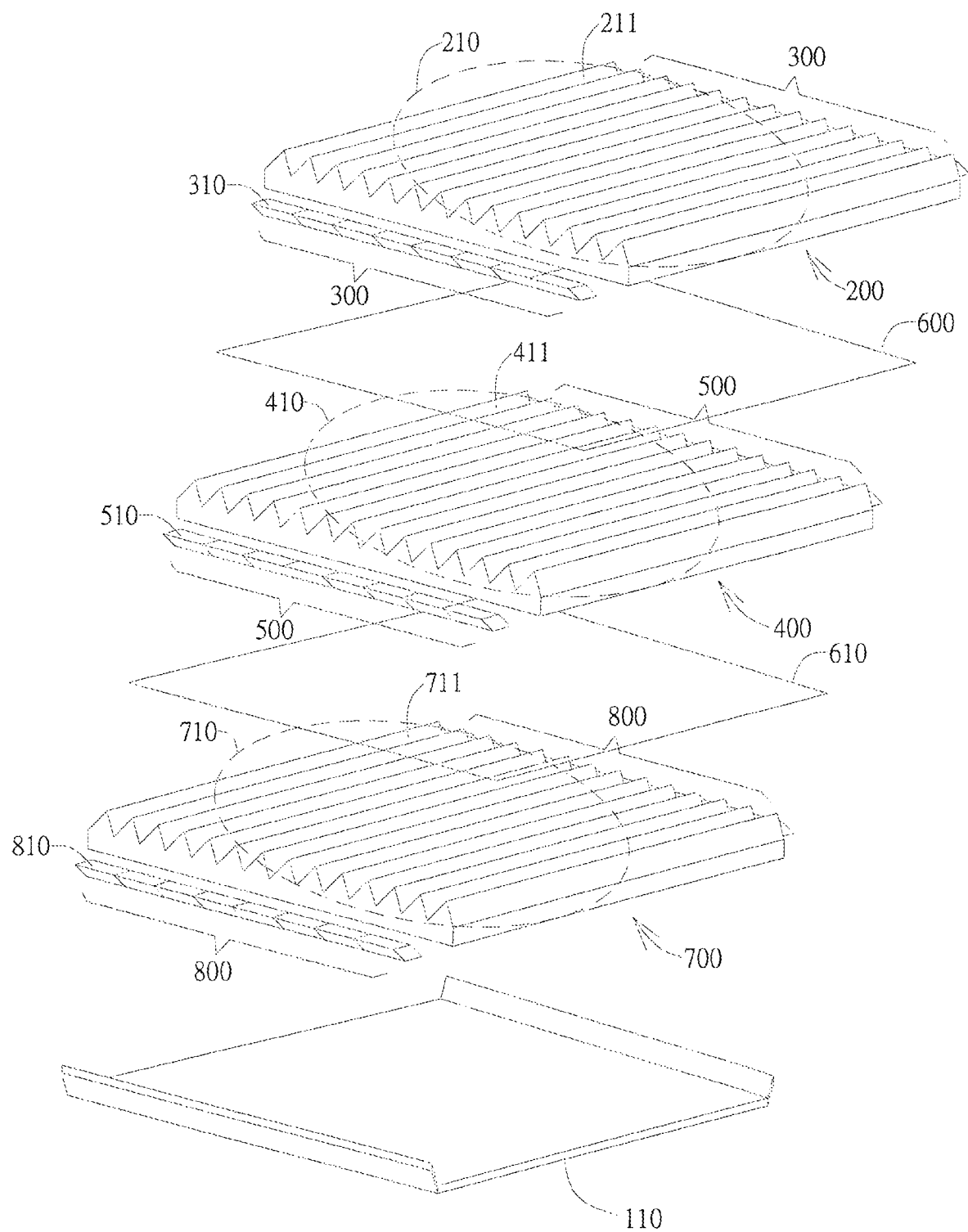
FIG. 6 is an exploded view of a variation of the backlight module illustrated in FIG. 2.

FIG. 6 is an exploded view of a variation of the backlight module 100 illustrated in FIG. 2. The backlight module of the present embodiment further includes a third light guide plate 700, a third light source set 800, and a second diffusion film 610, wherein the second diffusion film 610 is disposed between the second light guide plate 400 and the third light guide plate 700. The third light source set 800 includes a plurality of third light sources 810 disposed on two opposite third sides 724 (illustrated in FIG. 7) and emitting lights toward the third light guide plate 700. As FIG. 6 shows, the third light guide plate 700 is stacked to the second light guide plate 400 and faces the second lower structure layer 420 (illustrated in FIG. 4), wherein the third light guide plate 700 includes a third upper structure layer 710 facing the second light guide plate 400 and a third lower structure layer 720 (illustrated in FIG. 7) facing away from the second light guide plate 400.

As FIG. 6 shows, the third upper structure layer 710 includes a plurality of third prisms 711, wherein the third prisms 711 are distributed from one side of the third light guide plate 700 disposed with the third light sources 810 toward the opposite side of the third light guide plate 700 disposed with the third light sources 810. In the present embodiment, the material characteristics and the structure of the third upper structure layer 710 are substantially identical to those of the first upper structure layer 210 and the second upper structure layer 410 and therefore are not elaborated here.

FIG. 7 is a plane view of the first lower structure layer 220, the second lower structure layer 420, and the third lower structure layer 720 illustrated in FIG. 6. As FIG. 7 shows, the first lower structure layer 220 includes two first primary strips 221 and a first secondary strip 222, wherein the two first primary strips 221 are located at two opposite sides of the first secondary strip 222 to break the total internal reflection of lights generated by the first light sources 310 so that those lights can emerge from the first upper structure layer (not illustrated) of the first light guide plate 200. The second lower structure layer 420 illustrated in FIG. 7 includes two second primary strips 421 and a second secondary strip 422, wherein the two second primary strips 421 are located at two opposite sides of the second secondary strip 422 to receive and break the total internal reflection of lights generated by the second light sources 510 so that those lights can emerge from the second upper structure layer (not illustrated) of the second light guide plate 400 and travel toward the first lower structure layer 220 of the first light guide plate 200.

Similarly, the third lower structure layer 720 includes two third primary strips 721 and a third secondary strip 722, wherein the third primary strip 721 are distributed along the third side 724 of the third light guide plate 700. Furthermore, the first side 225, the second side 426, and the third side 724 are substantially parallel. Furthermore, the third primary strip 721 has a microstructure aperture ratio less than 60% and the third secondary strip 722 has a microstructure aperture ratio greater than 60%. In addition, the third secondary strip 722 is distributed along the third primary strip 721, wherein the third primary strip 721 is located between the third secondary strip 722 and the third side 724.

Furthermore, the third primary strip 721 illustrated in FIG. 7 further includes a fifth microstructure region 725 and a sixth microstructure region 726, wherein the sixth microstructure region 726 is located between the fifth microstructure region 725 and the third secondary strip 722. The microstructure aperture ratio of the fifth microstructure region 725 is less than the microstructure aperture ratio of the sixth microstructure region 726. In this way, the microstructure aperture ratio of the third lower structure layer 720 decreases from the third secondary strip 722 toward the third side 724.

As FIG. 7 shows, the two third primary strips 721 are disposed at two opposite sides of the third secondary strip 722 to receive and break the total internal reflection of lights generated by the third light sources 810 so that those lights can emerge from the third upper structure layer 710 (not illustrated) and travel toward the second lower structure layer 420 of the second light guide plate 400. Furthermore, the first primary strip 221, the first secondary strip 222, the second primary strip 421, the second secondary strip 422, the third primary strip 721, and the third secondary strip 722 are distributed along the extending direction of the first side 225 of the first light guide plate 200. In other words, the extending directions of the microstructure layers mentioned above are substantially parallel.

In the embodiment illustrated in FIG. 7, the first light guide plate 200, the second light guide plate 400, and the third light guide plate 700 have substantially equal areas and overlapping projections. The projection of the first lower structure layer 220 at least partially overlaps the second secondary strip 422 and therefore the second primary strip 421 is exposed outside the projection of the first lower structure layer 220 on the second light guide plate 400. In addition, the third primary strip 721 is exposed outside the projections of the first lower structure layer 220 and the second lower structure layer 420 on the third lower structure layer 720.

Furthermore, projections of the third primary strip 721 and the second primary strip 421 preferably partially overlap each other so that the light areas of the third primary strip 721 and the second primary strip 421 substantially partially overlap each other to blur the boundaries between projections of the two primary strips 421, 721 and prevent the occurrence of visible dark strips. In other words, the projection of the second secondary strip 422 on the third lower structure layer 720 substantially overlaps the third secondary strip 722, wherein the area of the second lower structure layer 420 is substantially greater than the area of the third secondary strip 722. In this way, the third primary strip 721 is exposed outside the projection of the second lower structure layer 420 on the third light guide plate 700. Projections of the first primary strip 221 and the second primary strip 421 partially overlap and therefore light areas of those primary strips 221, 421 partially overlap. Projections of the second primary strip 421 and the third primary strip 721 partially overlap and therefore light areas of those primary strips 421, 721 partially overlap. Furthermore, the third primary strip 721 is substantially located between the third light source set 800 and the projection of the second secondary strip 422 on the third lower structure layer 720. In this way, the backlight module of the present embodiment can utilize the difference in the locations of primary strips 221, 421, 721 and control the corresponding light sources 310, 510, 810 to generate light so that those light can emerge from those primary strips 221, 421, 721 and different portions of the corresponding light guide plates.

Furthermore, in the embodiment illustrated in FIG. 7, in order to improve the overall optical effect, the area of the first secondary strip 222 is preferably less than 25% of the area of the bottom surface of the first light guide plate 200. The area of the second secondary strip 422 is preferably between 25% and 70% of the area of the bottom surface of the second light guide plate 400. The area of the third secondary strip 722 is preferably between 70% and 90% of the area of the bottom surface of the third light guide plate 700. In different embodiments, the above-mentioned ratios between secondary strip 222, 422, 722 and the corresponding surfaces can be adjusted.

Furthermore, in the embodiment illustrated in FIG. 7, the first secondary strip 222 occupies 5% of the area of the bottom surface of the first light guide plate 200. The second secondary strip 422 occupies 50% of the area of the bottom surface of the second light guide plate 400. The third secondary strip 722 occupies 80% of the area of the bottom surface of the third light guide plate 700. In different embodiments, areas of the secondary strips 222, 422, 722 can be adjusted based on criterions such as the required area of the light area, luminous intensities of the light sources.

FIG. 8 is a plane view illustrating variations of the first lower structure layer 220, the second lower structure layer 420, and the third lower structure layer 720 illustrated in FIG. 5. The second light guide plate 400 and the third light guide plate 700 in FIG. 8 are stacked to replace the second light guide plate 400 illustrating in FIG. 5. In the present embodiment, the first primary strip 221 and the first secondary strip 222 of the first lower structure layer 220 are substantially identical to the first primary strip 221 and the first secondary strip 222 illustrated in FIG. 5 and therefore are not elaborated here. However, the second light sources 510 of the present embodiment are disposed at only one of the second sides 426 of the second light guide plate 400 and the third light sources 810 is disposed at only one of the third sides 724 of the third light guide plate 700, wherein projections of the second light sources 510 and the third light sources 810 are located at two sides of the first light guide plate 200.

As FIG. 8 shows, the second light sources 510 are disposed at the second side 426 of the second light guide plate 400. The second primary strip 421 is disposed along the second side 426 at one surface of the bottom surface of the second light guide plate 400 while the second secondary strip 422 is also disposed on the bottom surface and distributed along the second primary strip 421. Furthermore, the second lower structure layer 420 further includes a first buffer strip 425 having a microstructure aperture ratio less than 60% that is disposed at one side of the second secondary strip 422 opposite to the second primary strip 421. In the present embodiment, most of lights generated by the second light sources 510 emerge from the second primary strip 421 and the second secondary strip 422, wherein the rest of the lights emerge from the first buffer strip 425. In other words, the first buffer strip 425 is used to smooth out the difference in luminance at the boundary between the first buffer strip 425 and the second secondary strip 422.

As FIG. 8 shows, the second primary strip 421 and the first buffer strip 425 have different microstructure aperture ratios, wherein the microstructure aperture ratio of the first buffer strip 425 decreases from one side of the first buffer strip 425 near the second light sources 510 toward the opposite side of the first buffer strip 425.

Similarly, the third light sources 810 are disposed at the third side 724 of the third light guide plate 700. The third primary strip 721 is distributed along the third side 724 on the bottom surface of the third light guide plate 700. The third secondary strip 722 is distributed along the third primary strip 721 on the bottom surface of the third light guide plate 700. Furthermore, the third lower structure layer 720 of the present embodiment further includes a second buffer strip 723 having a microstructure aperture ratio less than 60% that is disposed at one side of the third secondary strip 722 opposite to the third primary strip 721. Similarly, the second buffer strip 723 is used to break the total internal reflection of lights not emerging from the third secondary strip 722 so that those lights can emerge from the second buffer strip 723. Therefore the second buffer strip 723 is used to smooth out the difference in luminance at the boundary between the second buffer strip 723 and the third secondary strip 722. In addition, the microstructure aperture ratio of the second buffer strip 723 decreases from one side of the second buffer strip 723 near the third light sources 810 toward the opposite sides of the second buffer strip 723. As FIG. 8 shows, the projection of the third lower structure layer 720 is substantially located between the third side 724 accommodating the third light sources 810 and the projection of the second lower structure layer 420. The projection of the second lower structure layer 420 is substantially between the second side 426 accommodating the second light sources 510 and the projection of the third lower structure layer 720.

Furthermore, as for the embodiments illustrated in FIG. 4, FIG. 5, and FIG. 7, it needs to be emphasized that in order to achieve better control of light areas and provide improved optical effect, the area of the secondary strip disposed on the top light guide plate is preferably less than the area of the secondary strip disposed on the underlying light guide plate. As FIG. 4 and FIG. 5 show, the area of the first secondary strip 222 is less than the area of the second secondary strip 422. As FIG. 7 shows, the area of the first secondary strip 222 is less than the area of the second secondary strip 422 and the area of the second secondary strip 422 is less than the area of the third secondary strip 722. Furthermore, the more light guide plates used by the backlight module 100 of the present embodiment, the less the area of the first secondary strip 222. For instance, the area of the first secondary strip 222 in the embodiment illustrated in FIG. 7 using 3 light guide plates is less than the area of the first secondary strip 222 in the embodiment illustrated in FIG. 4 which uses only two light guide plates.

More specifically, in the embodiments described above, ratios between areas of the first secondary strip 222, the second secondary strip 422, and the third secondary strip 722 and the surfaces of corresponding light guide plates are related to the number of light guide plates used in the backlight module 100. In order to achieve better control of the light areas and provide the desired optical effect, the area of the secondary strip disposed on the top most light guide plate is less than $1/(N+1)$ of the area of the bottom surface, wherein N is the number of light guide plates used in the backlight module 100. The area of secondary strip disposed on the Nth light guide plate at the bottom of the backlight module is preferably greater than $1-(1/N)$ of the area of bottom surface. When N is greater than 2, areas of secondary strips disposed on the light guide plates between the top and the bottom light guide plates are preferably between $[1/(N+1)]$ and $[1-(1/N)]$ of the area of the bottom surface.

For instance, when the backlight module 100 illustrated in FIG. 2 includes only the first light guide plate 200 and the second light guide plate 400, the area of the first secondary strip 222 is preferably less than ⅓ of the area of the bottom surface of the first light guide plate 200. On the other hand, the area of the second secondary strip 422 is preferably greater than ½ of the area of the bottom surface. Furthermore, as FIG. 6 shows, when the backlight module 100 includes the first light guide plate 200, the second light guide plate 400, and the third light guide plate 700, the area of the first secondary strip 222 is preferably less than ¼ of the area of the bottom surface of the first light guide plate 200; the area of the third secondary strip 722 is preferably greater than ⅔ of the area of the bottom surface of the third light guide plate 700. On the other hand, the area of the second secondary strip 422 is preferably between ¼ and ⅔ of the area of the bottom surface of the second light guide plate 400.

In the embodiments described above, the backlight module of the present embodiment uses 2 to 3 light guide plates and microstructure layers disposed on the light guide plates to alter the travelling directions of lights generated by the light sources to create light areas which can be separately driven to provide light, but is not limited thereto. In different embodiments, the backlight module of the present embodiment can use other numbers of light guide plates based on conditions such as the luminance intensity of light sources used or the light transmittance of the light guide plate.

The above is a detailed description of the particular embodiment which is not intended to limit the embodiment to the embodiment described. It is recognized that modifications within the scope of the embodiment will occur to a person skilled in the art. Such modifications and equivalents of the embodiment are intended for inclusion within the scope of this embodiment.

What is claimed is:

1. A backlight module, comprising:
    a first light guide plate including a first lower structure layer formed on a surface of the first light guide plate, wherein the first lower structure layer includes:
        a first primary strip, distributed along a first side of the first light guide plate, having a microstructure aperture ratio less than 60%; and
        a first secondary strip, distributed along the first primary strip, having a microstructure aperture ratio greater than 60%, wherein the first primary strip is located between the first secondary strip and the first side of the first light guide plate;
    a first light source set, disposed corresponding to the first side of the first light guide plate, for emitting lights toward the first side;
    a second light guide plate, stacked to the first light guide plate facing the first lower structure layer, the second light guide plate including a second lower structure layer formed on a surface of the second light guide plate facing away from the first light guide plate, wherein the second lower structure layer includes:
        a second primary strip, distributed along a second side of the second light guide plate, wherein the second side is parallel with the first side of the first light guide plate, the second primary strip has a microstructure aperture ratio less than 60%; and
        a second secondary strip, distributed along the second primary strip, having a microstructure aperture ratio greater than 60%, wherein the second primary strip is located between the second secondary strip and the second side of the second light guide plate; and
    a second light source set, disposed corresponding to the second side of the second light guide plate, for emitting lights toward the second side;
    wherein the second primary strip is exposed outside a projection of the first lower structure layer on the second lower structure layer, the first lower structure layer at least partially overlaps the second secondary strip.

2. The backlight module of claim 1, wherein an area of the first secondary strip is substantially less than 30% of an area of the surface of the first light guide plate, an area of the second secondary strip is substantially between 30% and 90% of an area of the surface of the second light guide plate.

3. The backlight module of claim 1, wherein the first light guide plate further includes a first upper structure layer, wherein an extending direction of the first upper structure layer is substantially parallel with a traveling direction of the lights emitted by the first light source set.

4. The backlight module of claim 3, wherein the second light guide plate further includes a second upper structure layer, wherein an extending direction of the second upper structure layer is substantially parallel with a traveling direction of the lights emitted by the second light source set, the extending direction of the first upper structure layer and the extending direction of the second upper structure layer are substantially parallel.

5. The backlight module of claim 4, wherein at least one of the first upper structure layer and the second upper structure layer includes a first prism and a second prism, the first prism and the second prism have different apex angles, different heights or different widths.

6. The backlight module of claim 5, wherein the apex angle of the first prism and the apex angle of the second prism are substantially between 80° and 100°.

7. The backlight module of claim 5, wherein the first upper structure layer includes the first prism, the second prism, and a third prism, the first prism is located between the second prism and the third prism, an included angle between the first prism and the adjacent second prism is different from an included angle between the first prism and the adjacent third prism.

8. The backlight module of claim 1, wherein the first light source set includes a plurality of first light sources sequentially distributed on the first side, each of the first light sources is selectively driven to emit light.

9. The backlight module of claim 1, wherein a luminous intensity of the first light source set is greater than a luminous intensity of the second light source set.

10. The backlight module of claim 1, further including a first diffusion film disposed between the first light guide plate and the second light guide plate.

11. The backlight module of claim 1, wherein a projection of the first secondary strip on the second lower structure layer substantially overlaps the second secondary strip, an area of the first lower structure layer is substantially larger than an area of the second secondary strip.

12. The backlight module of claim 1, wherein the second primary strip is located between the second light source set and a projection of the first secondary strip on the second lower structure layer.

13. The backlight module of claim 1, further including:
    a third light guide plate, stacked to the second light guide plate, facing the second lower structure layer, the third light guide plate including a third lower structure layer formed on a surface of the third light guide plate facing away from the second light guide plate, wherein the third lower structure layer includes:
        a third primary strip, distributed along a third side of the third light guide plate, wherein the third side is parallel with the second side of the second light guide plate, the third primary strip has a microstructure aperture ratio less than 60%; and
        a third secondary strip, distributed along the third primary strip, having a microstructure aperture ratio greater than 60%, wherein the third primary strip is located between the third secondary strip and the third side; and
    a third light source set, disposed corresponding to the third side of the third light guide plate, for emitting lights toward the third side, wherein the third primary light strip is exposed outside projections of the first lower structure layer and the second lower structure layer on the third lower structure layer.

14. The backlight module of claim 13, wherein a projection of the second secondary strip on the third lower structure substantially overlaps the third secondary strip, an area of the second lower structure layer is substantially larger than an area of the third secondary strip.

15. The backlight module of claim 13, wherein the third primary strip is located substantially between the third light source set and a projection of the second secondary strip on the third lower structure layer.

16. The backlight module of claim 13, wherein an area of the first secondary strip is substantially less than 25% of an area of the surface of the first light guide plate, an area of the second secondary strip is substantially between 25% and 70% of an area of the surface of the second light guide plate, an area of the third secondary strip is substantially between 70% and 90% of an area of the surface of the third light guide plate.

17. The backlight module of claim 1, wherein the first lower structure layer and the second lower structure layer include a printed strip, a printed dot, a raised strip, a raised dot, a recessed strip, a recessed dot, or a combination thereof.

18. The backlight module of claim 1, wherein the first primary strip includes a first microstructure region and a second microstructure region, the microstructure aperture ratio of the first microstructure region is less than the microstructure aperture ratio of the second microstructure region, the second microstructure region is located between the first microstructure region and the first secondary strip.

19. The backlight module of claim 1, wherein the second primary strip includes a first microstructure region and a second microstructure region, the microstructure aperture ratio of the first microstructure region is less than the microstructure aperture ratio of the second microstructure region, the second microstructure region is located between the first microstructure region and the second secondary strip.

20. The backlight module of claim 1, further including a third light guide plate, stacked to the second light guide plate, facing the second lower structure layer, wherein the third light guide plate includes a third lower structure layer formed on a surface of the third light guide plate facing away from the second light guide plate and distributed along a third side of the third light guide plate, a projection of the third lower structure layer is located substantially between the third side and a projection of the second lower structure layer, the projection of the second lower structure layer is substantially between the second side and the projection of the third lower structure layer.

21. The backlight module of claim 20, wherein the second lower structure layer further includes a buffer strip having a microstructure aperture ratio less than 60%, the second primary strip and the buffer strip are located at two opposite sides of the second secondary strip, the third lower structure layer further includes an additional buffer strip having a microstructure aperture ratio less than 60%, wherein the third primary strip and the additional buffer strip are located at two opposite sides of the third secondary strip.

22. A backlight module, including a light guide plate set composed of N light guide plates stacked to each other, wherein each of the light guide plate includes a lower structure layer, the lower structure layer comprises:
 a primary strip, distributed along a side of the light guide plate, having a microstructure aperture ratio less than 60%; and
 a secondary strip, distributed along the primary strip, having a microstructure aperture ratio greater than 60%, wherein the primary strip is located between the secondary strip and the side of the light guide plate;
 wherein an area of the secondary strip on an outermost light guide plate of the light guide plate set is less than $1/(N-1)$ of an area of the surface of the light guide plate accommodating the lower structure layer, an area of the secondary strip on the other outermost light guide plate of the light guide plate set is greater than $1-(1/N)$ of an area of the surface of the light guide plate accommodating the lower structure layer.

23. The backlight module of claim 22, wherein when N is greater than 2, an area of the secondary strip on the light guide plate/s between the two outermost light guide plates of the light guide plate set is between $[1/(N-1)]$ and $[1-(1/N)]$ of an area of the surface of the light guide plate accommodating the lower structure layer.

* * * * *